(12) United States Patent
Tu et al.

(10) Patent No.: US 11,688,054 B2
(45) Date of Patent: Jun. 27, 2023

(54) AUXILIARY PREDICTION SYSTEM FOR PREDICTING RELIABILITY, AND METHOD AND COMPUTER PROGRAM PRODUCT THEREOF

(71) Applicant: NATIONAL YANG MING CHIAO TUNG UNIVERSITY, Hsinchu (TW)

(72) Inventors: King-Ning Tu, Hsinchu (TW); Chih Chen, Hsinchu (TW); Yu-Chieh Lo, Hsinchu (TW); Nan-Yow Chen, New Taipei (TW); Kai-Cheng Shie, Taichung (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 32 days.

(21) Appl. No.: 17/472,955

(22) Filed: Sep. 13, 2021

(65) Prior Publication Data
US 2022/0392049 A1    Dec. 8, 2022

(30) Foreign Application Priority Data
Jun. 7, 2021 (TW) ................. 110120652

(51) Int. Cl.
*G06T 7/00* (2017.01)
*G06T 5/00* (2006.01)

(52) U.S. Cl.
CPC ........... *G06T 7/0004* (2013.01); *G06T 5/006* (2013.01); *G06T 5/007* (2013.01);
(Continued)

(58) Field of Classification Search
CPC . G06T 7/0002–001; G06T 2207/20081; G06T 2207/20084; G06T 2207/30108;
(Continued)

(56) References Cited

U.S. PATENT DOCUMENTS

| 2017/0200524 A1 | 7/2017 | Adler |
| 2021/0004946 A1* | 1/2021 | Yoon ...................... G06T 7/001 |
| 2022/0342316 A1* | 10/2022 | Kooiman .............. G03F 7/7065 |

FOREIGN PATENT DOCUMENTS

CN    102509108 A    6/2012

OTHER PUBLICATIONS

Al-Ameen, Zohair. "An improved contrast equalization technique for contrast enhancement in scanning electron microscopy images." Microscopy research and technique 81.10 (2018): 1132-1142. (Year: 2018).*

(Continued)

*Primary Examiner* — John B Strege
(74) *Attorney, Agent, or Firm* — Muncy, Geissler, Olds & Lowe, P.C.

(57) ABSTRACT

An auxiliary prediction system is provided to predict reliability of an object after a specific operation is applied to the target object. The auxiliary prediction system includes an image correction module and an analysis module. The image correction module performs an image correction procedure to convert an original image of the target object into a first correction image. The analysis module performs a feature analysis on the first correction image through an artificial intelligence model that has been trained, so as to predict whether the target object has a defect or not after the specific operation.

9 Claims, 6 Drawing Sheets

(52) U.S. Cl.
CPC .............. *G06T 2207/10081* (2013.01); *G06T 2207/20081* (2013.01); *G06T 2207/30148* (2013.01); *G06T 2207/30152* (2013.01)

(58) Field of Classification Search
CPC . G06T 2207/30141; G06T 2207/30148; G06T 2207/30152; G06T 5/006; G06T 5/007; G06T 2207/10081; G06T 2207/10116–10128; G06N 3/02–088; G06N 20/20; G01N 3/068; G01N 2203/0062; G01N 2203/0674
See application file for complete search history.

(56) References Cited

OTHER PUBLICATIONS

Osipov, Artem A., et al. "High-temperature etching of SiC in SF6/O2 inductively coupled plasma." Scientific reports 10.1 (2020): 1-10. (Year: 2020).*
Kapur, Jay P., and David P. Casasent. "Geometric Correction of SEM images." Hybrid Image and Signal Processing VII. vol. 4044. SPIE, 2000. (Year: 2000).*
Schmidt, Konstantin, et al. "Enhanced x-ray inspection of solder joints in smt electronics production using convolutional neural networks." 2020 IEEE 26th International Symposium for Design and Technology in Electronic Packaging (SIITME). IEEE, 2020. (Year: 2020).*
Buduma, N., and Nicholas Locascio. "'Fundamentals of Deep Learning: Designing Next-generation Machine Intelligence Algorithms' 2017 O'Reilly Media." (Year: 2017).*

* cited by examiner

AUXILIARY PREDICTION SYSTEM FOR PREDICTING RELIABILITY, AND METHOD AND COMPUTER PROGRAM PRODUCT THEREOF

BACKGROUND

1. Field of the Disclosure

The present disclosure relates to the technical field of auxiliary prediction and, more particularly, to the technical field of auxiliary prediction for predicting reliability failure.

2. Description of Related Art

When performing specific operations (such as power-on for energizing) on an electronic device, the electronic components (such as integrated circuits (IC)) inside the electronic device may be affected by electro-migration, thermal migration, or stress migration, which may result in damage to the internal microstructures (such as solder balls) and thus cause the electronic device to malfunction.

Currently, it relies on manpower to observe whether the microstructure is damaged with the naked eyes, but this method may cause misjudgment. In addition, in the current testing, whether the microstructure is damaged or not can be determined only after the electronic components are actually energized. Therefore, if there is damage, the electronic components can only be discarded, which is not helpful for cost control. In other words, there is a need for high-accuracy technology that can predict whether the microstructure will be damaged before energizing.

Therefore, it is desirable to provide an auxiliary prediction technology to solve the aforementioned problems.

SUMMARY

In one aspect of the present disclosure, there is provided an auxiliary prediction system for predicting reliability of a target object after a specific operation. The auxiliary prediction system includes an image correction module and an analysis module. The image correction module is provided to perform an image correction process for converting the original image of the target object into a first correction image. The analysis module uses an artificial intelligence model that has been trained to perform a feature analysis on the first correction image so as to predict whether the target object has a defect or not after a specific operation.

In another aspect of the present disclosure, there is provided an auxiliary prediction method for predicting reliability of a target object after a specific operation, wherein the method is performed by an auxiliary prediction system, and the auxiliary prediction system includes an image correction module and an analysis module. The method includes the steps of: using the image correction module to perform an image correction procedure for converting the original image of the target object into a first correction image; and using the analysis module to perform a feature analysis on the first correction image through an artificial intelligence model that has been trained so as to predict whether the target object has a defect or not after a specific operation.

In yet another aspect of the present disclosure, there is provided a computer program product for predicting reliability of a target object after a specific operation, wherein the auxiliary prediction system includes an image correction module and an analysis module. The computer program product includes: an instruction enabling the image correction module to perform an image correction procedure so as to convert the original image of the target object into a first correction image; and an instruction enabling the analysis module to perform a feature analysis on the first correction image through an artificial intelligence model that has been trained so as to predict whether the target object has a defect or not after a specific operation.

Other objects, advantages, and novel features of the disclosure will become more apparent from the following detailed description when taken in conjunction with the accompanying drawings.

DETAILED DESCRIPTION

The following embodiments describe the implementation and operation principles of the present disclosure. Those skilled in the art to which the present disclosure pertains may understand the features and effects of this disclosure through the above-mentioned embodiments, and may perform combination, modification, replacement or adaption based on the spirit of the present disclosure The ordinals recited herein such as "first", "second" and so on are intended only to describe the elements claimed and imply or represent neither that the claimed elements have any preceding ordinals, nor that sequence between one claimed element and another claimed element or between steps of a manufacturing method. The use of these ordinals is merely to differentiate one claimed element having a certain designation from another claimed element having the same designation.

In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two elements, and does not limit whether there is contact between the two elements, unless specifically limited. Furthermore, when the present disclosure recites multiple effects, if the word "or" is used between the effects, it means that the effects can exist independently, but it does not exclude that multiple effects can exist at the same time.

Taking into account the measurement problems and errors of a specific amount (i.e., the limitation of the measurement system), the descriptions of "about . . . " and "substantially . . . " in the specification may include the recorded values and the acceptable deviation range that can be judged by those skilled in the art. For example, "about . . . " means within one or more standard deviations, or within +/−20%, +/−15%, +/−10%, +/−5%, +/−3% of the standard value. It is noted that, due to the deviation of the processing process or the instability of the processing process, the description of "same", "equal", "equivalent" or the like in the specification also includes the meaning of "approximately".

Besides, in the specification, terms such as "system", "apparatus", "device", "module", or "unit" may at least refer to an electronic component, or a digital circuit, an analog circuit, or a circuit in a broader sense composed of multiple electronic components, and unless otherwise specified, they do not necessarily have a level or hierarchical relationship. In addition, the computer, terminal, or server may all include the aforementioned components or be implemented in the aforementioned manner.

The effectiveness of the protection scope of the present disclosure can be demonstrated at least through the components or the operating mechanism of the components provided in the product, but the method of proof is not limited to this. In addition, if the software execution steps are involved, at least evidence can be provided through reverse engineering or according to the instructions of the program, but the method of proof is not limited to this.

Figure 1:
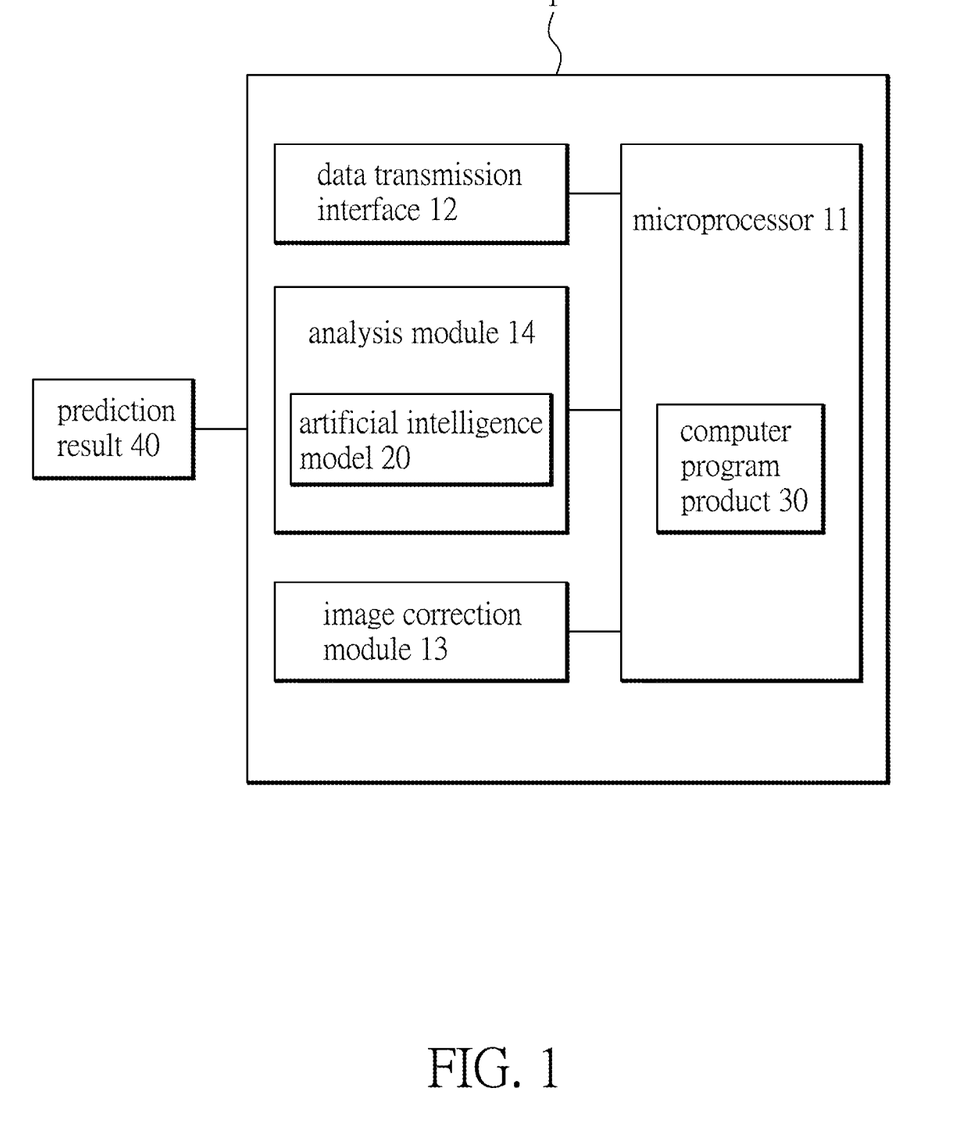
FIG. 1 is a system architecture diagram of an auxiliary prediction system according to an embodiment of the present disclosure.

FIG. 1 is a system architecture diagram of an auxiliary prediction system 1 according to an embodiment of the present disclosure.

As shown in FIG. 1, the auxiliary prediction system 1 includes an image correction module 13 and an analysis module 14. After an image of a target object is inputted to the auxiliary prediction system 1, the image correction module 13 may perform an image correction procedure on the image, and the analysis module 14 may perform a feature analysis on the corrected image to generate a prediction result 40. In addition, in one embodiment, the auxiliary prediction system 1 may further include a data transmission interface 12 for receiving or transmitting data, such as receiving images.

The auxiliary prediction system 1 of the present disclosure may be used to predict the reliability of the target object after a specific operation. For example, when the reliability is high, it indicates that the target object has no defect and, when the reliability is low, it indicates that the target object has a defect. In other words, the auxiliary prediction system 1 of the present disclosure can predict whether the target object has a defect or not after a specific operation.

In one embodiment, the target object may be a microstructure of an electronic component inside an electronic device, wherein the electronic component may include, but not limited to, a chip, a circuit board, an active component, a passive component, a fan-out component, a heat pipe, etc., and the microstructure may include, but not limited to, solder micro-bumps, pins, copper-copper joints, metal solder joints, etc. In one embodiment, the specific operation may include, but not limited to, a procedure in the manufacturing process, such as a heating procedure, an energizing procedure, a stress application procedure, a temperature change procedure, a high temperature and high humidity test, etc. In one embodiment, the defects of the target object after a specific operation may include, but not limited to, a necking state, generation of holes, production of reactants, etc. It thus can be seen that the auxiliary prediction system 1 of the present disclosure may predict whether the microstructure of an electronic component is damaged or not after undergoing a specific operation. For example, by only inputting the image of the solder micro-bumps that are not energized to the auxiliary prediction system 1, the auxiliary prediction system 1 can predict whether the solder micro-bumps have defects after energizing, and it is not limited thereto.

Figure 2:
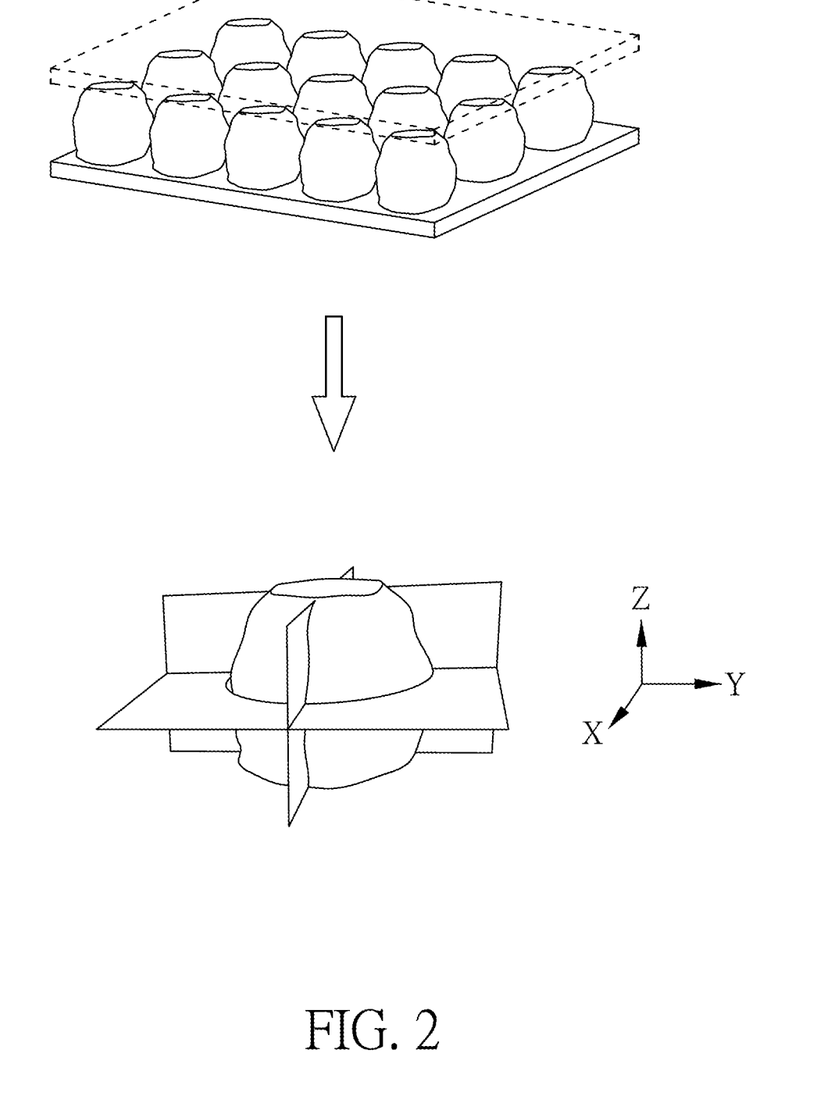
FIG. 2 is a schematic diagram of a microstructure according to an embodiment of the present disclosure.

In one embodiment, the image of the target object may be, for example, a three-dimensional image reconstructed from a plurality of X-ray tomographic images taken by X-ray tomography, but it is not limited thereto. FIG. 2 is a schematic diagram of a three-dimensional image of a microstructure (such as a solder micro-bump) according to an embodiment of the present disclosure. As shown in FIG. 2, the "three-dimensional image" of the solder micro-bump may include X-ray tomographic images of the solder micro-bump in multiple directions. It is noted that, in order to make the description of the present disclosure clearer, the image of the target object before the specific operation is referred to as the "original image", and the image of the target object after the specific operation is referred to as the "post-operation image". The image obtained from the original image converted by the image correction procedure is referred to as the "first correction image", and the image obtained from the post-operation image converted by the image correction procedure is referred to as the "second correction image".

Please refer to FIG. 1 again. Next, the functions and implementation aspects of each component will be described.

First, the auxiliary prediction system 1 will be explained.

In one embodiment, the auxiliary prediction system 1 may be an image processing device, which may be implemented by any device with a microprocessor 11, such as a desktop computer, a notebook computer, a smart mobile device, a server, a cloud host, or the like, but not limited thereto. In one embodiment, the auxiliary prediction system 1 may be provided with a network communication function to transmit data through the network. The network communication may be a wired network or a wireless network. Therefore, the auxiliary prediction system 1 may obtain image data through the network. In one embodiment, the auxiliary prediction system 1 may have a display, so the prompt message may be displayed on the display. In one embodiment, the functions of the auxiliary prediction system 1 may be implemented by a computer program product 30 executed by the microprocessor 11, where the computer program product 30 may have a plurality of instructions that enable the processor to perform special operations, so that the processor may realize functions of the image correction module 13, the analysis module 14 or the artificial intelligence model 20. In one embodiment, the computer program product 30 may be stored in a non-transitory computer readable medium (such as a memory), but it is not limited thereto. In one embodiment, the computer program product 30 may be pre-stored in a network server for users to download. However, the present disclosure is not limited thereto.

Next, the data transmission interface 12 will be described.

In one embodiment, the data transmission interface 12 may be used to obtain data external to the auxiliary prediction system 1; that is, users (such as inspectors) may use the data transmission interface 12 to input the image of the target object (solder micro-bumps or other microstructures) to the auxiliary prediction system 1. In one embodiment, the data transmission interface 12 may be a physical connection port for obtaining external data. For example, when the auxiliary prediction system 1 is implemented by a computer, the data transmission interface 12 may be a USB interface or various transmission line connectors on the computer, but not limited thereto. In addition, the data transmission interface 12 may be integrated with a wireless communication chip, so that data may be received in a wireless transmission manner. However, the present disclosure is not limited thereto.

Next, the image correction module 13 will be described.

The image correction module 13 may perform an image correction procedure on the image obtained by the data transmission interface 12 so as to correct the specification of the image to the specification applicable to the analysis module 14. Therefore, through the image correction procedure, the original image can be converted into a first correction image, and the post-operation image can be converted into a second correction image. In addition, in one embodiment, the image correction module 13 may be a functional module, which may be implemented by a program code (for example, a part of the computer program product 30), but is not limited thereto. For example, when the microprocessor 11 of the auxiliary prediction system 1 executes the program code, the microprocessor 11 may perform various functions of the image correction module 13, such as performing the image correction procedure. However, the present disclosure is not limited thereto.

Next, the analysis module 14 will be described.

After the image correction module 13 completes the correction of the image, the analysis module 14 may perform feature analysis on the corrected image through an artificial intelligence model 20, thereby outputting a prediction result 40, wherein the prediction result 40 may indicate whether there are defects or not. In one embodiment, the analysis module 14 may be a functional module, which may be implemented by a program code (for example, a part of the computer program product 30), but is not limited thereto. For example, when the microprocessor 11 of the auxiliary prediction system 1 executes the program code, the microprocessor 11 may perform various functions of the analysis module 14, such as performing feature analysis on the image through the trained artificial intelligence model 20. In addition, in one embodiment, the analysis module 14 and the artificial intelligence model 20 may be integrated, but it is not limited thereto.

Next, the artificial intelligence model 20 will be described.

The artificial intelligence model 20 may generate accurate prediction capabilities through training (such as, but not limited to, machine learning). In the training phase, the artificial intelligence model 20 may be regarded as a training model, which may be trained by analyzing a large number of images and which may find features that are highly related to occurrence of defects from the original images of a large number of target objects thereby establishing the predicted path, and set various features that are found as the feature nodes in the predicted path. In more detail, the artificial intelligence model 20 may determine the feature nodes in the prediction path through training, such as which feature to choose, what is the feature threshold value corresponding to the feature of the feature node (whether to meet this feature), how to connect the feature nodes, etc. In one embodiment, the artificial intelligence model 20 can be implemented by program code.

In addition, in one embodiment, before training, a preliminary model (i.e., a training model) of the artificial intelligence model 20 is constructed in advance, for example, setting basic parameters, and the auxiliary prediction system 1 may enable the artificial intelligence model 20 to be trained through the instructions in the computer program product 30 so as to construct the prediction path of the artificial intelligence model 20. After that, training and verification are performed continuously until the analysis accuracy of the artificial intelligence model 20 reaches the threshold, thereby completing the training. After that, when the training of the artificial intelligence model 20 is completed, the auxiliary prediction system 1 may actually perform predictions. It is noted that, in order to distinguish the artificial intelligence model 20 before and after training, the untrained artificial intelligence model 20 is referred to as a "training model" in the following description. In one embodiment, the training model has to undergo a "training phase" to perform training, and undergo a "testing phase" to test the accuracy of the feature path.

In one embodiment, the artificial intelligence model 20 finds features from the image, wherein the features may include, but not limited to, changes in the appearance of the microstructure (such as distortion, skew, etc.), changes in the interior of the microstructure (changes invisible from the appearance, such as holes or cracks generated inside the microstructure), changes in the volume of the microstructure (such as total volume of internal different substructures and material being increased or decreased) and/or changes in the cross-section of the microstructure (such as the tomographic image changes in horizontal, vertical or arbitrary planes).

In one embodiment, the artificial intelligence model 20 may adopt various machine learning architectures including, but not limited to, convolutional neural network architecture, random forest architecture, support vector machine architecture, deep learning architecture, recurrent neural network architecture, etc. For the convenience of explanation, the convolutional neural network architecture is taken as an example.

Figure 3:
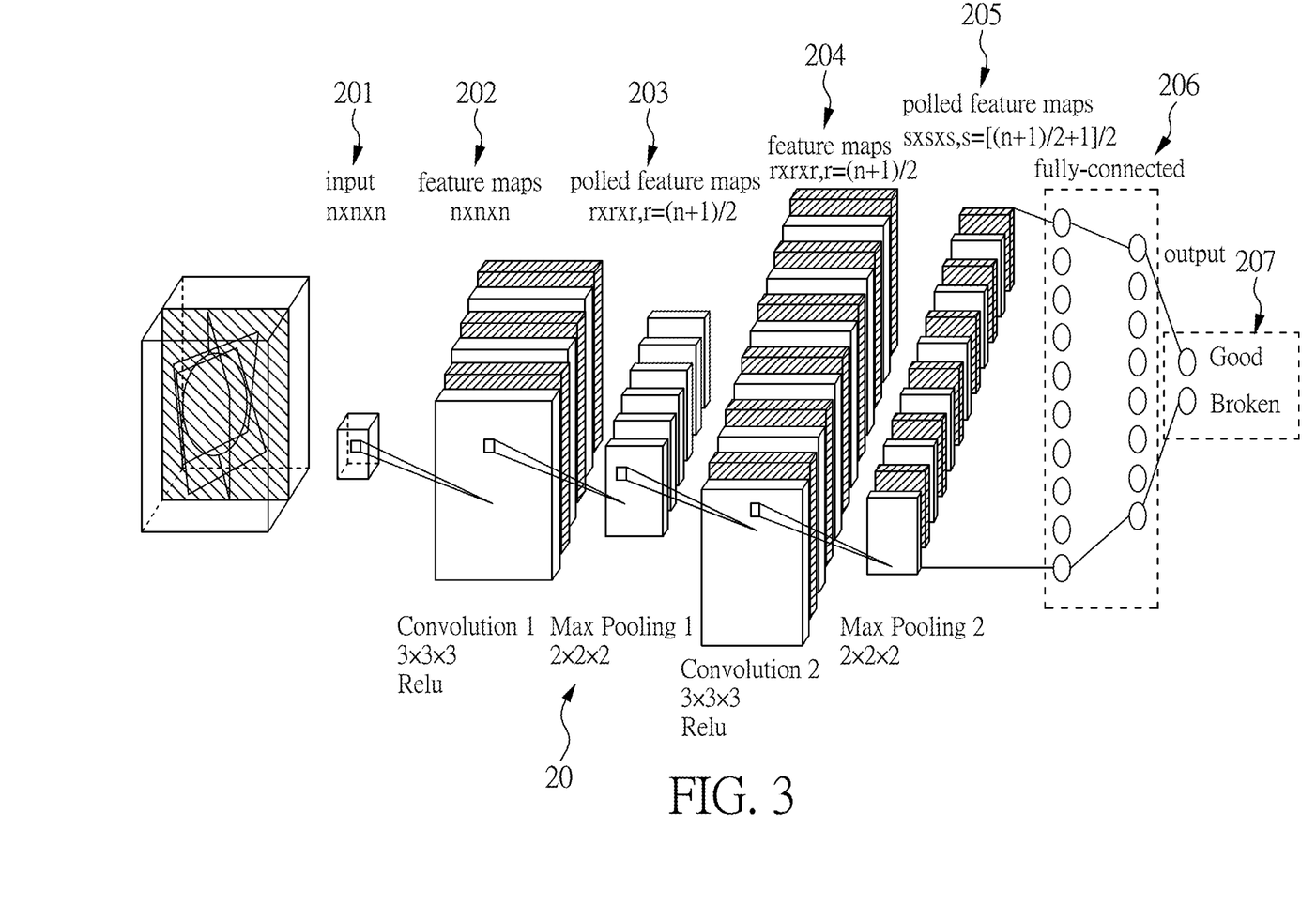
FIG. 3 is an architecture diagram of an artificial intelligence model according to an embodiment of the present disclosure.

FIG. 3 is an architecture diagram of an artificial intelligence model 20 according to an embodiment of the present disclosure, in which the architecture of a convolutional neural network is taken as an example of, but the present disclosure is not limited thereto. As shown in FIG. 3, the architecture of the artificial intelligence model 20 of the present disclosure may include an input terminal 201, a first convolutional layer 202, a first pooling layer 203, a second convolutional layer 204, a second pooling layer 205, a fully connected layer 206 and an output terminal 207. In one embodiment, the input terminal 201 may be used to receive images inputted from the outside of the artificial intelligence model 20, and the first convolutional layer 202, the first pooling layer 203, the second convolutional layer 204 and the second pooling layer 205 may be used to obtain the features of image from the image. The fully connected layer 206 may be used to provide the prediction path established according to various features, so that, after passing through the prediction path, the features of image may produce the probabilities of options of various prediction results 40 (for example, the probability of "good" and the probability of "broken"). The output terminal 207 may output the most probable prediction result 40. In addition, the size of each convolutional layer or pooling layer (for example, 3×3×3 or 2×2×2) indicated in FIG. 3 is only an example, and is not a limitation of the present disclosure.

In this way, the functions and implementation aspects of the main components of the auxiliary prediction system 1 can be understood.

Next, the basic operation mode of the auxiliary prediction system 1 will be described, with reference to FIG. 4 as well as FIG. 1 to FIG. 3.

Figure 4:
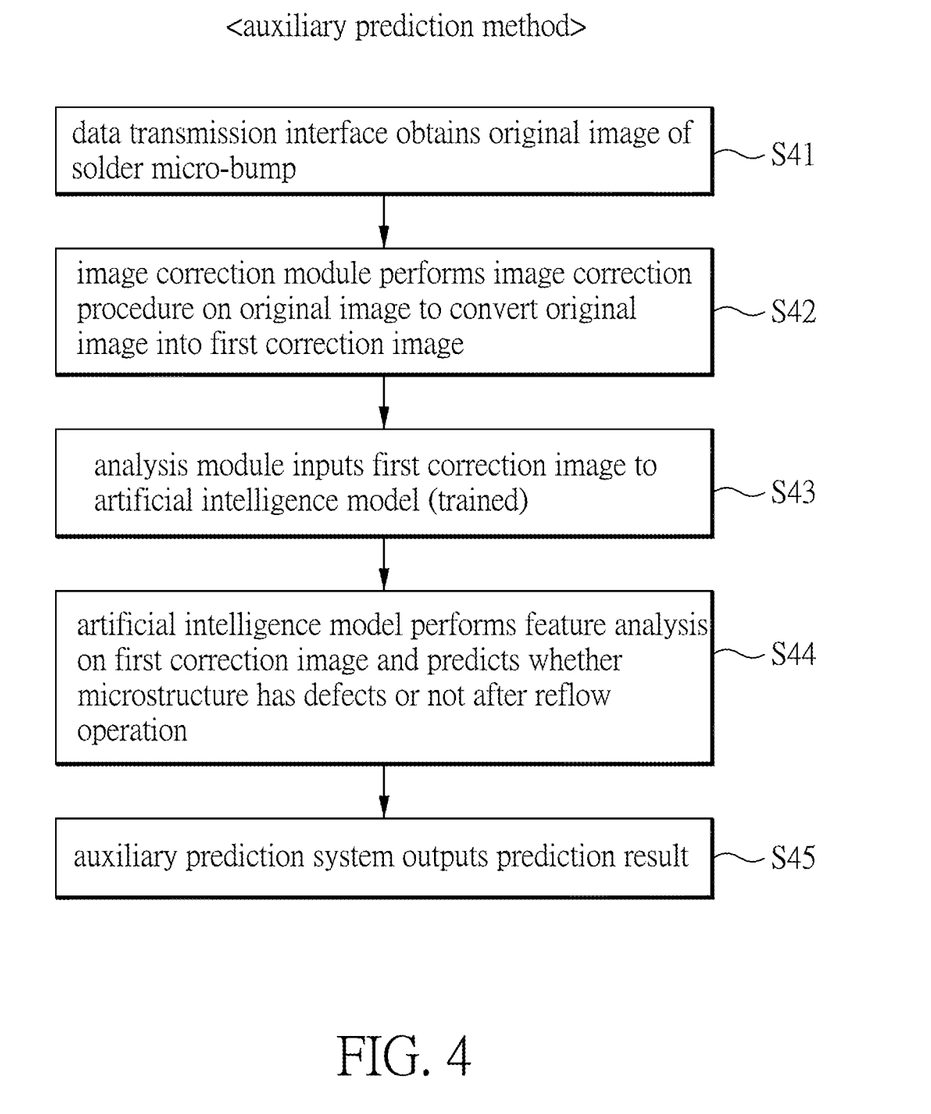
FIG. 4 is a flowchart of an auxiliary prediction method according to an embodiment of the present disclosure.

FIG. 4 is a flowchart illustrating the basic steps of an auxiliary prediction method according to an embodiment of the present disclosure. The method is performed by the auxiliary prediction system 1 of FIG. 1, wherein the artificial intelligence model 20 is in a trained state. In addition, for convenience of description, in FIG. 4, an example is given in which the target object is a solder micro-bump, the specific operation is a reflow operation, and the defect is a necking state, but the present disclosure is not limited thereto.

First, step S41 is executed, in which the data transmission interface 12 of the auxiliary prediction system 1 obtains an original image of a solder micro-bump. Then, step S42 is executed, in which the image correction module 13 performs an image correction procedure on the original image to convert the original image into a first correction image. Then, step S43 is executed, in which the analysis module 14 inputs the first correction image to the artificial intelligence model 20. Then, step S44 is executed, in which the artificial intelligence model 20 performs a feature analysis on the first correction image and predicts whether the solder micro-bump has defects or not after the reflow operation (that is, whether to have a necking state). Then, step S45 is executed, in which the auxiliary prediction system 1 outputs the prediction result 40.

It can be seen that, after the artificial intelligence model 20 is established, by only inputting the original image of the solder micro-bump (before performing reflow operation) to the auxiliary prediction system 1, the auxiliary prediction system 1 may immediately predict whether the solder micro-bump has a necking state during the reflow operation. However, the present disclosure is not limited thereto.

In order to enable the auxiliary prediction system 1 to perform the aforementioned steps S41 to S45, the artificial intelligence model 20 must first be trained using a large amount of training data so as to establish a prediction path with sufficient accuracy.

Next, the training process of the artificial intelligence model 20 will be described in detail, with reference to FIG. 5 as well as FIG. 1 to FIG. 4.

Figure 5:
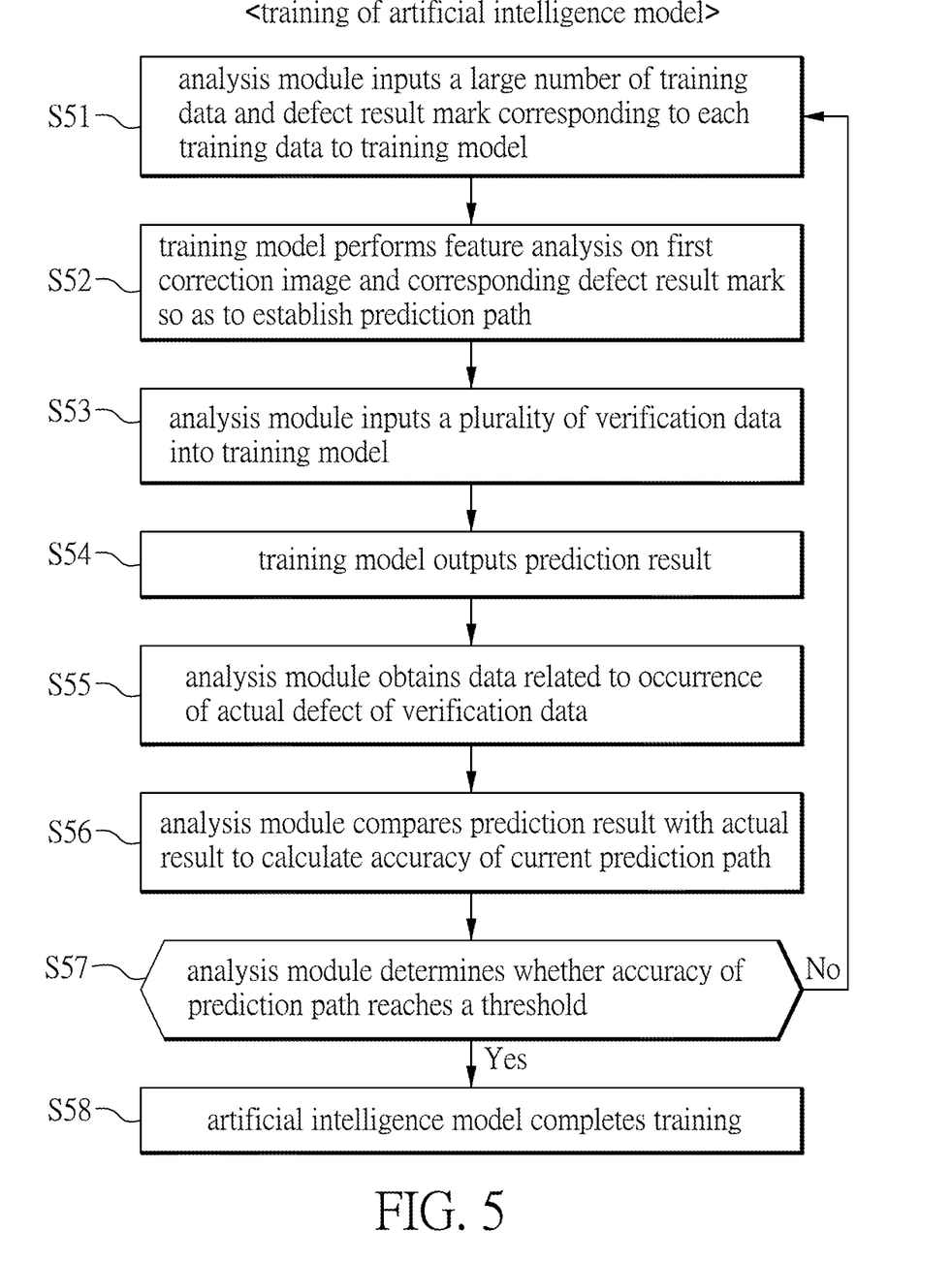
FIG. 5 is a flowchart of a method for establishing an artificial intelligence model according to an embodiment of the present disclosure.

FIG. 5 is a flowchart illustrating the steps of the training process of the artificial intelligence model 20 according to an embodiment of the present disclosure, wherein the steps may be implemented by the processor of the auxiliary prediction system 1 that executes the instructions in the computer program product 30, and please also refer to FIG. 1 to FIG. 4.

First, step S51 is executed, in which the analysis module 14 inputs a large number of training data (for example, a large number of first correction images of solder micro-bumps) and the defect result mark corresponding to each training data (for example, the occurrence situation of the actual defect) to the training model of the artificial intelligence model 20. Then, step S52 is executed, in which the training model of the artificial intelligence model 20 performs a feature analysis on the first correction images and the corresponding defect result mark, so as to establish a prediction path. Then, step S53 is executed, in which the analysis module 14 inputs a plurality of verification data (for example, the first correction images of other solder micro-bumps that have not been used for training) into the training model of the artificial intelligence model 20. Then, step S54 is executed, in which the training model of the artificial intelligence model 20 outputs the prediction result 40. Then, step S55 is executed, in which the analysis module 14 obtains data related to occurrence of actual defect of the verification data. Then, step S56 is executed, in which the analysis module 14 compares the prediction result 40 with the actual result to calculate the accuracy of the current prediction path. Then, step S57 is executed, in which the analysis module 14 determines whether the accuracy of the prediction path reaches a threshold (for example, the accuracy rate is greater than or equal to 90%, but it is not limited thereto). If it is affirmative, step S58 is executed, in which the artificial intelligence model 20 completes the training; otherwise, steps S51 to S57 are executed again until the accuracy of the prediction path reaches the threshold.

In one embodiment, the training model of the artificial intelligence model 20 may automatically find the possible correlation between the image feature and "whether the defect occurs", and use the feature with high correlation as the feature node in the prediction path.

In one embodiment, the number of training data may be 10,000 to 1,000,000, but is not limited thereto. In one embodiment, the number of data for verification may be 1,000 to 10,000, wherein the number of data for comparison may be less than the number of data for training, but is not limited thereto.

In this way, the training process of the artificial intelligence model 20 can be understood.

In addition, in the training process of the artificial intelligence model 20, a large number of first correction images of training data have to be used and, in the formal use after training, the image to be predicted has to be converted into the first correction image. Therefore, how to convert the original image (or the post-operation image) into the first correction image (or the second correction image) is also the focus of the present disclosure.

Next, the process of image correction will be described, with reference to FIG. 6 as well as FIG. 1 to FIG. 5.

Figure 6:
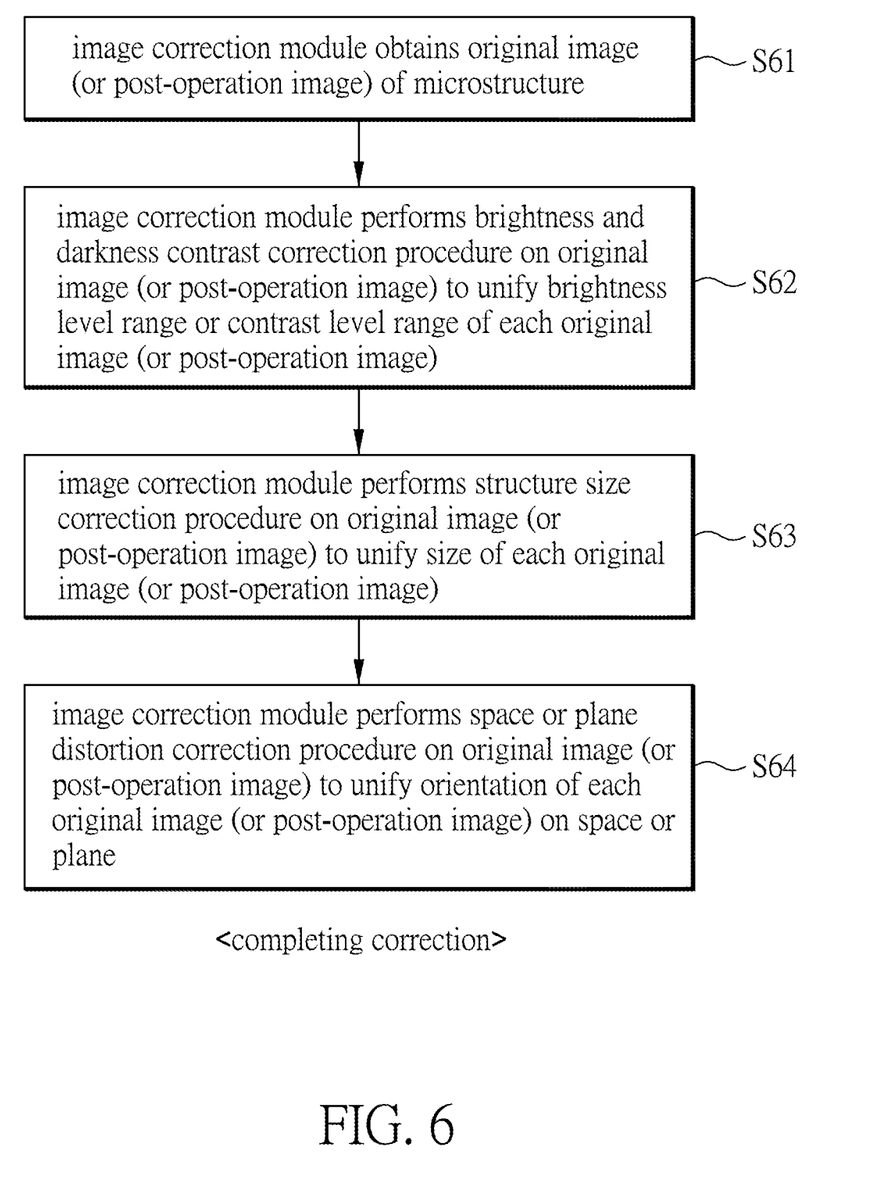
FIG. 6 is a flowchart of an image correction procedure according to an embodiment of the present disclosure.

FIG. 6 is a flowchart illustrating the steps of an image correction procedure according to an embodiment of the present disclosure, wherein the image correction procedure may include, but not limited to, a light-dark contrast correction procedure, a structure size correction procedure, and/or a space or plane distortion correction procedure.

As shown in FIG. 6, step S61 is first executed, in which the image correction module 13 obtains the original image (or post-operation image) of the solder micro-bumps. Then, step S62 is executed, in which the image correction module 13 performs a brightness and darkness contrast correction procedure on the original image (or post-operation image) to unify the brightness level range or the contrast level range of each original image (or post-operation image). In other words, through the brightness and darkness contrast correction procedure, the brightness level range or contrast level range of each of the original image and post-operation image is consistent. Then, step S63 is executed, in which the image correction module 13 performs a structure size correction procedure on the original image (or post-operation image) to unify the size of each original image (or post-operation image). In other words, through the structure size correction procedure, the size of the microstructure in each of the original image and post-operation image is consistent. Then, step S64 is executed, in which the image correction module 13 performs a space or plane distortion correction procedure on the original image (or post-operation image) to unify the orientation of each original image (or post-operation image) on the space or plane. In other words, through the space or plane distortion correction procedure, the orientation of the microstructures in each of the original image and post-operation image is consistent. In this way, the original image can be converted into the first correction image, and the post-operation image can be converted into the second correction image.

In one embodiment of step S62, the image correction module 13 may pre-store a correction image, wherein the correction image has a standardized brightness level range (or contrast level range). Then, the image correction module 13 may adjust the peak and valley values of the brightness level range (or contrast level range) of all pixels of the original image or the post-operation image, and the adjustment continues until being consistent with the brightness level range or contrast level range of the correction image. In this way, each of the first correction image and the second correction image may have the same level range of brightness or contrast. However, the present disclosure is not limited thereto.

In one embodiment of step S63, the image correction module 13 may pre-store a correction image, and use the size of an object of the correction image as a scaling reference. Then, the image correction module 13 may find the same object on the original image or the post-operation image, and adjust the size of the object on the original image or the post-operation image according to the scaling reference, so as to make the size of the original image or the post-operation image size consistent with the size of the correction image. In this way, the microstructures in each of the first correction image and the second correction image may have the same size. However, the present disclosure is not limited thereto.

In one embodiment of step S64, the image correction module 13 may pre-store a correction image, and use the orientation of an object in the correction image as an orientation reference. Then, the image correction module 13 may find the same object on the original image or the post-operation image, and adjust the orientation of the object according to the orientation reference, so that the orientation of the original image or the post-operation image is consistent with the orientation of the correction image. In this way, the microstructures in each of the first correction image and the second correction image may have the same orientation. However, the present disclosure is not limited thereto.

It is noted that the content of the steps S62 to S64 is only an example but not a limitation, and the order of the steps S62 to S64 may also be exchanged, or may be performed simultaneously. In addition, as long as it is feasible, the present disclosure may add more steps or delete certain steps according to requirements.

As a result, the image correction procedure can be understood.

In addition, one of the characteristics of the present disclosure is to actually determine whether a defect occurs based on the second correction image.

Next, the method for establishing the defect result mark (that is, how to actually determine whether there is a defect) will be described. The method may be implemented through an image analysis module and performs determination by comparing the first correction image and the second correction image. The image analysis module may be the analysis module 14 itself, or may be another analysis module arranged in the auxiliary prediction system 1 or another analysis module arranged outside the auxiliary prediction system 1.

In one embodiment, the image analysis module may determine whether the solder micro-bumps have defects or not after reflow according to the change in the area size of the solder ball in a specific cross-sectional direction on the first correction image and the second correction image of a solder micro-bump. In this way, the image analysis module may establish a defect result mark corresponding to each solder micro-bump. However, the present disclosure is not limited thereto.

It thus can be seen that, through "image correction", "defect determination" and "artificial intelligence model training", the auxiliary prediction system 1 of the present disclosure may generate the reliability of predicting the target object after a specific operation, so as to solve the problems of prior art.

The aforementioned embodiments are examples only for convenience of description. The scope of the present disclosure is claimed hereinafter in the claims and is not limited to the embodiments.

What is claimed is:

1. An auxiliary prediction system for predicting reliability of a target object after a specific operation, comprising:
   an image correction module for performing an image correction procedure to convert an original image of the target object into a first correction image; and
   an analysis module using an artificial intelligence model that has been trained to perform a feature analysis on the first correction image so as to predict whether the target object has a defect or not after the specific operation;
   wherein the image correction procedure includes a brightness and darkness contrast correction procedure, a structure size correction procedure, and a space or plane distortion correction procedure;
   wherein the target object is at least a solder micro-bump.

2. The auxiliary prediction system of claim 1, wherein the original image is defined as an image of the target object before the specific operation.

3. The auxiliary prediction system of claim 1, wherein the artificial intelligence model is formed by a training model undergoing a plurality of trainings, each training enables the training model to perform an analysis by using a plurality of first correction images for training and a defect result mark of each object for training after the specific operation so as to generate a prediction path, and the artificial intelligence model continuously performs training until an accuracy of the prediction path reaches a threshold.

4. The auxiliary prediction system of claim 1, wherein the target object is a microstructure of an electronic device, the specific operation includes a heating procedure, an electrifying procedure, a stress application procedure or a temperature change procedure in a manufacturing process of the electronic device, and the defect of the target object after the specific operation includes a necking state.

5. An auxiliary prediction method for predicting reliability of a target object after a specific operation, which is performed by an auxiliary prediction system including an image correction module and an analysis module, comprising the steps of:
   using the image correction module to perform an image correction procedure to convert an original image of the target object into a first correction image; and
   using the analysis module to perform a feature analysis on the first correction image through an artificial intelligence model that has been trained so as to predict whether the target object has a defect or not after the specific operation;
   wherein the image correction procedure includes a brightness and darkness contrast correction procedure, a structure size correction procedure, and a space or plane distortion correction procedure;
   wherein the target object is at least a solder micro-bump.

6. The auxiliary prediction method of claim 5, wherein the original image is defined as an image of the target object before the specific operation.

7. The auxiliary prediction method of claim 5, wherein the artificial intelligence model is formed by a training model undergoing a plurality of trainings, and wherein each training enables the training model to use a plurality of first correction images for training and a defect result mark of each object for training after the specific operation so as to generate a prediction path, and the artificial intelligence model continuously performs training until an accuracy of the prediction path reaches a threshold.

8. The auxiliary prediction system of claim 5, wherein the target object is a microstructure of an electronic device, the specific operation includes a heating procedure, an electrifying procedure, a stress application procedure or a temperature change procedure in a manufacturing process of the electronic device, and the defect of the target object after the specific operation includes a necking state.

9. A computer program product stored in a non-transitory computer readable medium to enable an auxiliary prediction system to predict reliability of a target object after a specific operation, wherein the auxiliary prediction system includes an image correction module and an analysis module, the computer program product comprising:

an instruction enabling the image correction module to perform an image correction procedure to convert an original image of the target object into a first correction image; and an instruction enabling the analysis module to perform a feature analysis on the first correction image through an artificial intelligence model that has been trained so as to predict whether the target object has a defect or not after the specific operation;

wherein the image correction procedure includes a brightness and darkness contrast correction procedure, a structure size correction procedure, and a space or plane distortion correction procedure;

wherein the target object is at least a solder micro-bump.

* * * * *